(12) United States Patent
Deng et al.

(10) Patent No.: US 11,465,860 B2
(45) Date of Patent: Oct. 11, 2022

(54) STEEL PLATE SUSPENSION CONVEYING DEVICE AND METHOD AND APPLICATION THEREOF

(71) Applicant: JIANGXI UNIVERSITY OF SCIENCE AND TECHNOLOGY, Ganzhou (CN)

(72) Inventors: Yongfang Deng, Ganzhou (CN); Weichao Zhang, Ganzhou (CN); Jie Yang, Ganzhou (CN); Bin Deng, Ganzhou (CN)

(73) Assignee: JIANGXI UNIVERSITY OF SCIENCE AND TECHNOLOGY, Ganzhou (CN)

( * ) Notice: Subject to any disclaimer, the term of this patent is extended or adjusted under 35 U.S.C. 154(b) by 85 days.

(21) Appl. No.: 17/265,658

(22) PCT Filed: Dec. 27, 2019

(86) PCT No.: PCT/CN2019/129108
§ 371 (c)(1),
(2) Date: Feb. 3, 2021

(87) PCT Pub. No.: WO2021/128252
PCT Pub. Date: Jul. 1, 2021

(65) Prior Publication Data
US 2022/0097983 A1 Mar. 31, 2022

(51) Int. Cl.
*B65G 54/02* (2006.01)
*B21D 43/00* (2006.01)
*B65G 43/08* (2006.01)

(52) U.S. Cl.
CPC ............. *B65G 54/02* (2013.01); *B21D 43/00* (2013.01); *B65G 43/08* (2013.01); *B65G 2203/025* (2013.01); *B65G 2203/0233* (2013.01)

(58) Field of Classification Search
CPC .............. B65G 54/02; B65G 43/08; B65G 2203/0233; B65G 2203/025; B21D 43/00
(Continued)

(56) References Cited

U.S. PATENT DOCUMENTS

2019/0006216 A1* 1/2019 Lau ................... H01L 21/67715

FOREIGN PATENT DOCUMENTS

| CN | 205132894 U | * | 4/2016 |
| CN | 110550459 A | * | 12/2019 |

(Continued)

*Primary Examiner* — Michael McCullough
*Assistant Examiner* — Lester Rushin, III
(74) *Attorney, Agent, or Firm* — WPAT, PC

(57) ABSTRACT

A steel plate suspension conveying device and method thereof, includes an initial suspension module, an intermediate transfer module and a tail end unloading module that are respectively provided with a plurality of electromagnets, wherein the electromagnets (5-6) of the initial suspension module controls the steel plate for suspension, the electromagnets (7-14) of the intermediate transfer module controls the motion of the steel plate toward the tail end unloading module, and the electromagnets (15-17) of the tail end unloading module controls the landing of the steel plate; sensor modules (18) installed on the electromagnets, and are capable of detecting the position, speed and temperature information of the steel plate conveyed by the electromagnets; a central processing unit (4) receiving the information sent by the sensor modules (18) and adjusts the magnitude of a current/voltage flowing into the electromagnets, thereby adjusting the magnitude of the electromagnet attraction applied by the electromagnets to the steel plate. The steel plate is conveyed by using suspension, and the steel plate is sufficiently cooled in the conveying process, so that the grain size and grain distribution of the steel plate are more (Continued)

uniform, thereby improving the consistency of the steel plate and enhancing the performance of the steel plate.

10 Claims, 3 Drawing Sheets

(58) Field of Classification Search
USPC .......................................................... 198/619
See application file for complete search history.

(56) References Cited

FOREIGN PATENT DOCUMENTS

| | | | | |
|---|---|---|---|---|
| CN | 211935553 U | * | 11/2020 | |
| CN | 215974521 U | * | 3/2022 | |
| CN | 114496452 A | * | 5/2022 | |
| JP | 2019194126 A | * | 11/2019 | ....... H01L 21/67259 |

* cited by examiner

STEEL PLATE SUSPENSION CONVEYING DEVICE AND METHOD AND APPLICATION THEREOF

FIELD OF THE INVENTION

The present application relates to the field of conveying devices, in particular to a steel plate suspension conveying device and method and application thereof.

BACKGROUND OF THE INVENTION

In industrial production, in order to facilitate the conveyance of steel plates from one place to another, the steel plates are usually conveyed by rollers after being rolled, but the steel plates are prone to form waves, arches, scratches and potential defects on the surface contacting the rollers, which affects the accuracy and performance of the steel plates. For hot rolling, the roller conveyance may cause nonuniform heat dissipation of the steel plates, which affects the uniformity of the grain size and grain distribution of the steel plates and reduces the consistency of the steel plates.

The Chinese invention patent No. 201810065214.5 discloses a steel plate conveying rack. By conveying the steel plate on the adjustable-height conveying rack, the conveying efficiency is enhanced and the cost is saved. However, the contact between the steel plate and the conveying rack is inevitable, and the conveyance of the steel plate is still contact conveyance in essence. For the steel plate that has just been rolled, the contact conveyance will cause defects on the surface of the steel plate, which affects the machining accuracy and performance of the steel plate. Especially for the steel plate that has just been hot-rolled, since the bottom surface of the steel plate is in contact with the conveying rack and the other parts are in contact with the air, the heat dissipation of the steel plate is not uniform, which affects the grain size and grain distribution of the steel plate.

The Chinese invention patent No. 201711297138.2 discloses an automatic control system for steel plate conveyance. By cutting the steel plate on an operating table and conveying the cut steel plate away, the cutting and conveying efficiency is enhanced. At the same time, a temperature detection system is disposed in the conveying system to avoid the hidden danger that the cut steel plate is high in temperature and may easily burn people. However, such conveyance of the steel plate is still contact conveyance in essence, which affects the machining accuracy and performance of the steel plate and also affects the uniformity of the grain size and grain distribution of the steel plate.

SUMMARY OF THE INVENTION

In order to overcome the defects caused by nonuniform heat dissipation and contact conveyance of the steel plate after rolling in the prior art and to enhance the performance and consistency of the rolled steel plate, the present application provides a steel plate suspension conveying device and method. According to the suspension conveying device, the rolled steel plate is conveyed by using suspension, and the steel plate is sufficiently cooled in the conveying process, so that the grain size and grain distribution of the steel plate are more uniform, thereby improving the consistency of the steel plate and enhancing the performance of the steel plate.

To achieve the above objective, the present application provides the following technical solutions:

A steel plate suspension conveying device includes:

an initial suspension module and a tail end unloading module that are installed horizontally;

an intermediate transfer module installed between the initial suspension module and the tail end unloading module, wherein an included angle exists between the intermediate transfer module and the horizontal plane;

a plurality of electromagnets capable of applying electromagnet attraction to a steel plate, respectively installed on the initial suspension module, the intermediate transfer module and the tail end unloading module, wherein the electromagnets of the initial suspension module controls the suspension of the steel plate, the electromagnets of the intermediate transfer module controls the motion of the steel plate toward the tail end unloading module, and the electromagnets of the tail end unloading module controls the landing of the steel plate;

sensor modules installed on the electromagnets, wherein the sensor modules are capable of detecting the position, speed and temperature information of the steel plate conveyed by the electromagnets; and a central processing unit connected to the electromagnets and the sensor modules, wherein the central processing unit is capable of receiving the information sent by the sensor modules and adjusting the magnitude of a current/voltage flowing into the electromagnets, thereby adjusting the magnitude of the electromagnet attraction applied by the electromagnets to the steel plate.

Preferably, an included angle between the electromagnets of the intermediate transfer module and the horizontal plane is 0°-60°.

Preferably, an installation distance between every adjacent two of the electromagnets is 200 mm-4000 mm.

Preferably, each of the sensor modules includes a displacement sensor, a speed sensor and a temperature sensor.

Preferably, the initial suspension module, the intermediate transfer module and the tail end unloading module make the steel plate suspended below the electromagnets within 150 mm-3000 mm.

Preferably, the electromagnets make a conveying speed of the steel plate 0.01 m/s-10 m/s.

Preferably, the initial suspension module, the intermediate transfer module and the tail end unloading module are sequentially connected to form a linear layout or a spiral layout.

A second aspect of the present application provides application of the above steel plate suspension conveying device in transportation of magnetic materials.

A third aspect of the present application provides a steel plate suspension conveying method. The method is carried out in the above suspension conveying device, including the following steps:

S1, connecting the initial suspension module to a discharge port of a rolling mill, driving a steel plate to enter the initial suspension module by the rolling mill, and then adjusting the electromagnets of the initial suspension module to generate electromagnetic attraction by the sensor modules in cooperation with the central processing unit so as to control the steel plate for suspension;

S2, making the suspended steel plate enter the intermediate transfer module by using inertia of the steel plate or driving of the rolling mill, and then adjusting the electromagnets of the intermediate transfer module to generate electromagnetic attraction by the sensor modules in cooperation with the central processing unit so as to control the motion of the steel plate toward the tail end unloading module; and S3, adjusting a magnitude of the electromagnetic attraction of the electromagnets of the tail end unloading module by the sensor modules in cooperation with the central processing unit such that the steel plate is unloaded and lands, after the intermediate transfer module controls the steel plate to enter the tail end unloading module.

Further, when the sensor modules detect following deviation information: a position misalignment of the steel plate, a distance deviation between the steel plate and the electromagnets or an unsatisfactory motion speed of the steel plate, the sensor modules immediately transmit the detected deviation information to the central processing unit, and then the central processing unit controls a current flowing into the electromagnets, thereby adjusting the attraction of the electromagnets to the steel plate to restore a motion state of the steel plate.

According to the above technical solution, the steel plate suspension conveying device of the present application conveys the rolled steel plates by using suspension. Compared with the contact conveyance in the prior art in which the steel plates are prone to form waves, arches, scratches and potential defects on the surface contacting the rollers, the suspension conveyance of the present application makes the steel plates sufficiently cooled in the conveying process, so that the grain size and grain distribution of the steel plates are more uniform, thereby improving the consistency of the steel plates and enhancing the performance of the steel plates.

Other features and advantages of embodiments of the present application will be described in detail in the Detailed Description of the Embodiments below.

BRIEF DESCRIPTION OF DRAWINGS

The accompanying drawings are intended to provide a further understanding of the embodiments of the present application and constitute a part of the specification. They are used to explain the embodiments of the present application together with the Detailed Description of the Embodiments below, but do not constitute a limitation to the embodiments of the present application. In the accompanying drawings.

Figure 1:
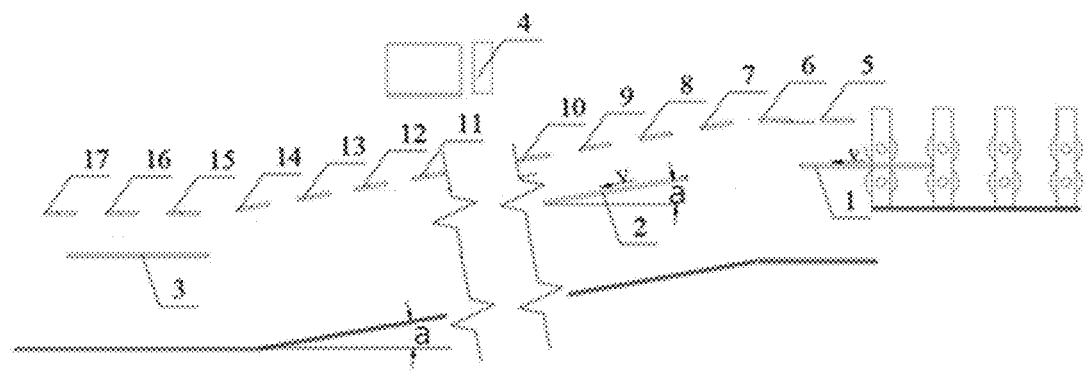
FIG. 1 is a schematic diagram of a suspension conveying device according to a preferred embodiment of the present application.
Figure 2:
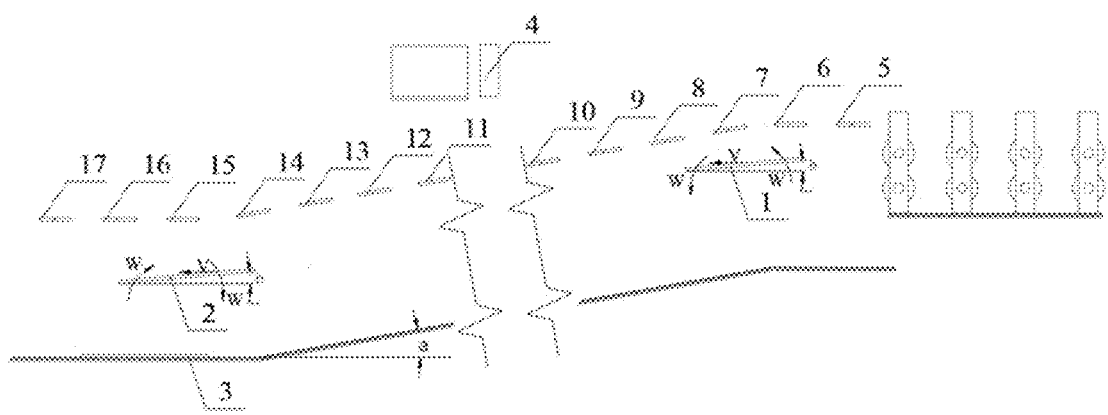
FIG. 2 is a schematic diagram showing turning of a steel plate in a suspension conveying device according to a preferred embodiment of the present application.
Figure 3:
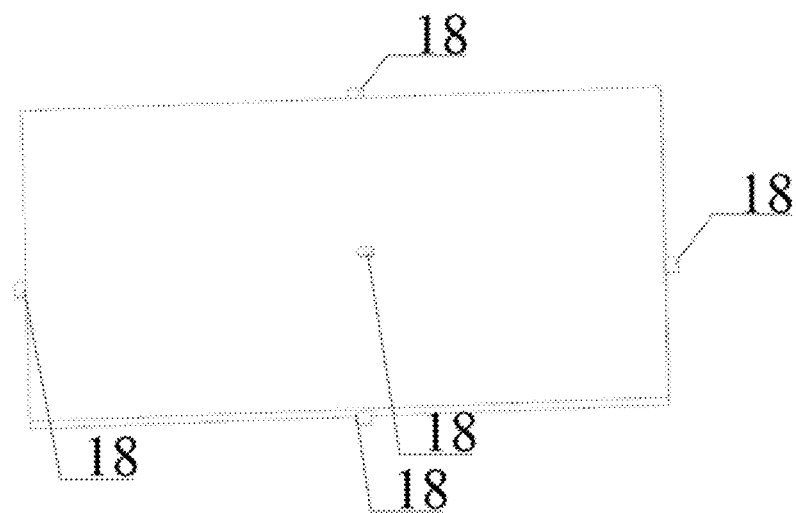
FIG. 3 is an enlarged schematic diagram of an electromagnet and sensor modules of a suspension conveying device according to a preferred embodiment of the present application.
Figure 4A:
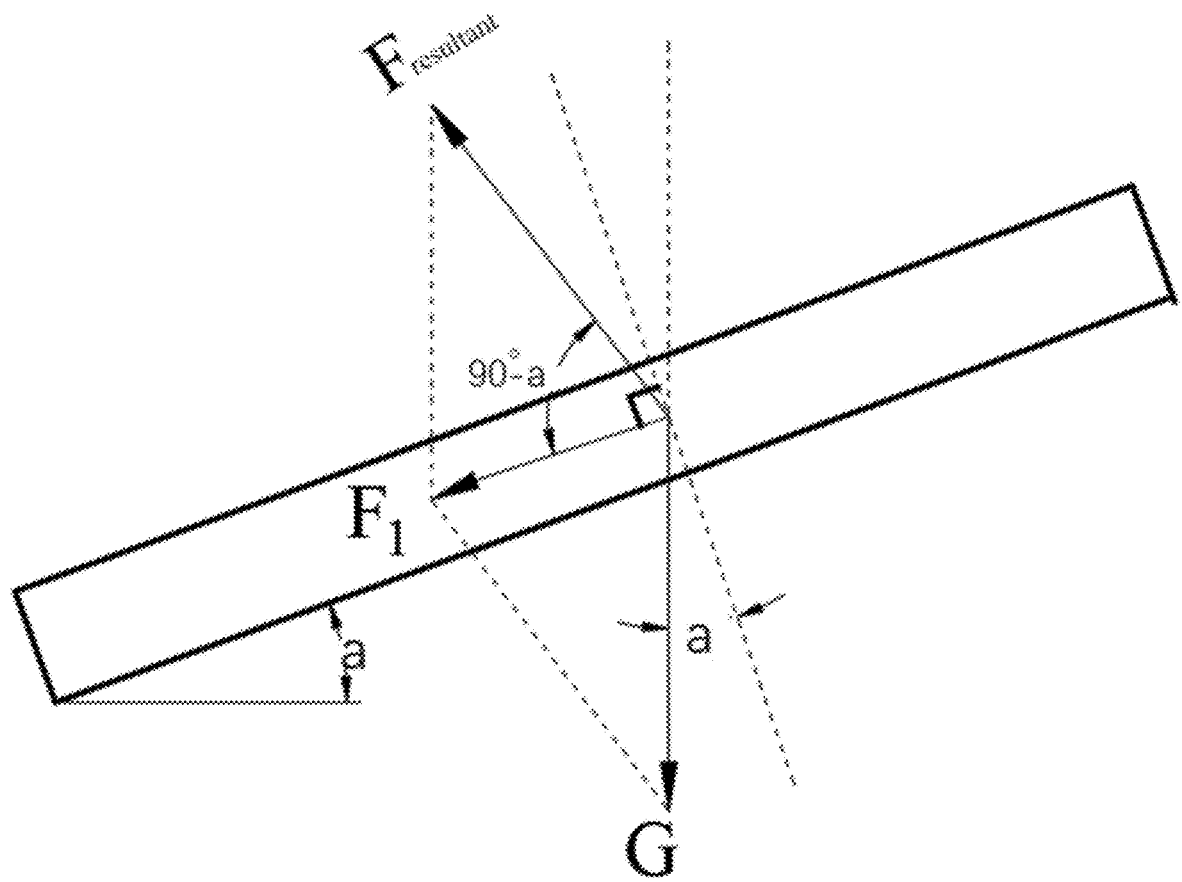
FIGS. 4a and 4b show force analysis diagrams of a steel plate in an intermediate transfer module according to a preferred embodiment of the present application, wherein 4a is the force diagram of the steel plate in an accelerated forward motion, and 4b is the force analysis diagram of the steel plate in a uniform motion after reaching a certain speed.
Figure 4B:
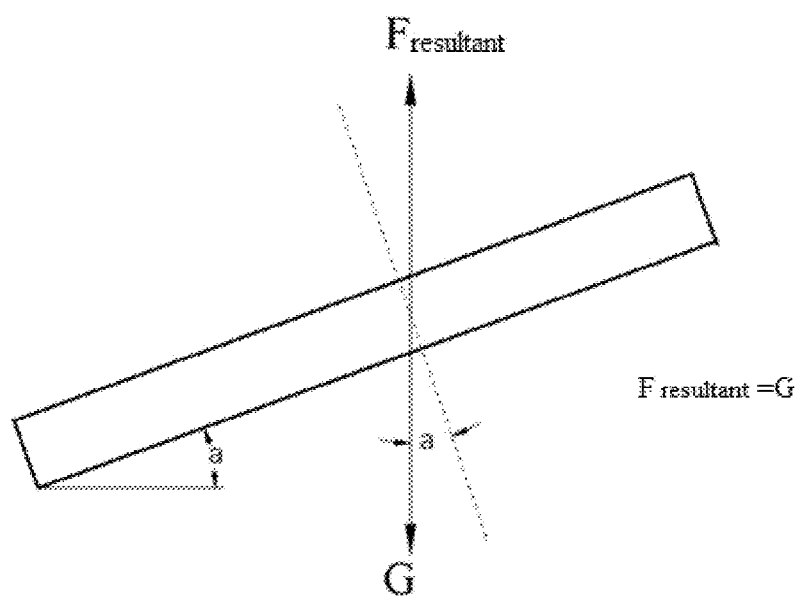

DESCRIPTION OF THE REFERENCE NUMERALS 1 is a steel plate at an initial suspension module; 2 is a steel plate at an intermediate transfer module; 3 is a steel plate at a tail end unloading module; 4 is a central processing unit; 5-17 are electromagnets, wherein 5-6 are the electromagnets of the initial suspension module, 7-14 are the electromagnets of the intermediate transfer module, and 15-17 are the electromagnets of the tail end unloading module; 18 is a sensor module(s).

DETAILED DESCRIPTION OF THE EMBODIMENTS

Specific embodiments of the present application will be described in detail below in conjunction with the accompanying drawings. It should be understood that the specific embodiments described herein are merely illustrative of the embodiments of the present application and are not intended to limit the embodiments of the present application.

In the embodiments of the present application, in the case of no explanation to the contrary, words for location used such as "up, down, top, bottom" are usually for the direction shown in the accompanying drawings or for describing the mutual positional relationship between the components in the vertical, perpendicular or gravitational direction.

The present application provides a steel plate suspension conveying device, including an initial suspension module, an intermediate transfer module and a tail end unloading module. The initial suspension module and the tail end unloading module are installed horizontally. The intermediate transfer module is installed between the initial suspension module and the tail end unloading module, and an included angle exists between the intermediate transfer module and the horizontal plane, that is, the intermediate transfer module has a slope. A plurality of electromagnets 5-17 capable of applying electromagnet attraction to a steel plate are respectively installed on the initial suspension module, the intermediate transfer module and the tail end unloading module. The electromagnets 5-6 of the initial suspension module controls the suspension of the steel plate, the electromagnets 7-14 of the intermediate transfer module controls the motion of the steel plate toward the tail end unloading module, and the electromagnets 15-17 of the tail end unloading module controls the landing of the steel plate.

Sensor module 18 capable of detecting the position, speed and temperature information of the steel plates 1-3 conveyed by the electromagnets 5-17 are installed on the electromagnets 5-17. A central processing unit 4 connected to the electromagnets 5-17 and the sensor module 18 is capable of receiving the information sent by the sensor module 18 and adjusting the magnitude of a current/voltage flowing into the electromagnets 5-17, thereby adjusting the magnitude of the electromagnet attraction applied by the electromagnets 5-17 to the steel plates 1-3.

In a preferred embodiment of the present application, an included angle between the electromagnets 7-14 of the intermediate transfer module and the horizontal plane is 0°-60°, which can be specifically adjusted according to production needs.

It can be specifically understood that the conveying device of the present application mainly includes the central processing unit 4 and the electromagnets 5-17, and the electromagnets 5-17 are distributed along a conveying path of the steel plates 1-3, one at a certain interval. The electromagnets 5-17 are connected to the central processing unit 4 and controlled by the central processing unit 4. The entire conveying device may be divided into three sections, namely the initial suspension module, the intermediate transfer module and the tail end unloading module.

The electromagnets 5-6 of the initial suspension module are parallel to the rolling mill placed horizontally. An included angle exists between the electromagnets 7-14 of the intermediate transfer module and the rolling mill placed horizontally. The electromagnets 15-17 of the tail end unloading module are parallel to the rolling mill placed horizontally, and are located above a steel plate unloading area.

In a preferred embodiment of the present application, an installation distance between every adjacent two of the electromagnets 5-17 is 200 mm-4000 mm.

In a preferred embodiment of the present application, the sensor module 18 includes a displacement sensor, a speed sensor and a temperature sensor. The displacement sensor and the speed sensor detect a distance between the steel plates and the electromagnets 5-17 and detect a running speed of the steel plates 1-3, and further, the temperature sensor detects a surface temperature of the steel plates 1-3, which can avoid accidental scalds and burns.

In a preferred embodiment of the present application, the initial suspension module, the intermediate transfer module and the tail end unloading module make the steel plates 1-3 suspended below the electromagnets 5-17 within 150 mm-3000 mm.

In a preferred embodiment, the electromagnets 5-17 make a conveying speed of the steel plates 1-3 0.01 m/s-10 m/s.

In a preferred embodiment of the present application, the initial suspension module, the intermediate transfer module and the tail end unloading module are sequentially connected to form a linear layout or a spiral layout. The length of the conveying line of the device of the present application may be adjusted according to production needs, and its total length is 200 mm-60000 mm. The lengths of the initial suspension module, the intermediate transfer module and the tail end unloading module of the conveying line may be adjusted according to the length, width and thickness of the steel plates 1-3. Each module has a length of 50 mm-10000 mm. The steel plates 1-3 to be conveyed by the device of the present application have a length of 10 mm-7000 mm, a width of 5 mm-10000 mm and a thickness of 0.1 mm-500 mm.

In a preferred embodiment of the present application, an included angle between rollers of the rolling mill and the horizontal plane is −60°-60°.

The steel plate suspension conveying device of the present application conveys the rolled steel plates 1-3 by using suspension. Compared with the contact conveyance in the prior art in which the steel plates 1-3 are prone to form waves, arches, scratches and potential defects on the surface contacting the rollers, the suspension conveyance of the present application makes the steel plates 1-3 sufficiently cooled in the conveying process, so that the grain size and grain distribution of the steel plates 1-3 are more uniform, thereby improving the consistency of the steel plates 1-3 and enhancing the performance of the steel plates 1-3.

The present application further provides a steel plate suspension conveying method. The method is carried out by using the above steel plate suspension conveying device, including the following steps:

S1, connecting the initial suspension module to a discharge port of a rolling mill, driving a steel plate 1 to enter the initial suspension module by the rolling mill, and then adjusting the electromagnets 5-6 of the initial suspension module to generate electromagnetic attraction by the sensor modules 18 in cooperation with the central processing unit 4 so as to control the suspension of the steel plate 1;

S2, making the suspended steel plate 1 enter the intermediate transfer module by using inertia of the steel plate 1 or driving of the rolling mill, and then adjusting the electromagnets 7-14 of the intermediate transfer module to generate electromagnetic attraction by the sensor modules 18 in cooperation with the central processing unit 4 so as to control the motion of the steel plate 2 toward the tail end unloading module; and S3, after the intermediate transfer module controls the steel plate 2 to enter the tail end unloading module, adjusting the magnitude of the electromagnetic attraction of the electromagnets 15-17 of the tail end unloading module by the sensor modules 18 in cooperation with the central processing unit 4 such that the steel plate 3 is unloaded and lands.

Step S1 is carried out at the steel plate 1 of the initial suspension module, the steel plate 1 actually used is produced, and for hot rolling, the temperature is high at this time. Step S2 is carried out at the steel plate 2 of the intermediate transfer module, the steel plate 2 actually used is produced, and for hot rolling, the temperature of the steel plate 2 of the intermediate transfer module is continuously reduced during the forward conveyance. Step S3 is carried out at the steel plate 3 of the tail end unloading module, the steel plate 3 actually used is produced, and for hot rolling, the steel plate 3 at the tail end unloading module has already been cooled to the needed temperature.

The present application further provides application of the steel plate suspension conveying device in transportation of magnetic materials. The device can transport not only steel plates, but also all magnetic materials, including iron, cobalt, nickel and other materials.

The working mode of the device of the present application is as follows:

When the steel plate 1 is conveyed out from the rolling mill and the sensor modules 18 on the electromagnets 5-6 detect that the steel plate 1 is being conveyed, the position and speed information of the steel plate 1 is transmitted to the central processing unit 4, and the central processing unit 4 controls the current flowing into the electromagnets 5-6 according to the position and speed of the electromagnets 5-6 and the steel plate 2, thereby adjusting the attraction of the electromagnets 5-6 to the steel plate 1. Under the synergistic actions of the electromagnets 5-6, the resultant force of the electromagnet attractions applied to the steel plate 1 is equal to its own gravity in an opposite direction, so that the steel plate 1 is suspended below the electromagnets 5-6, and driven by the rolling mill to move forward until the steel plate 1 is completely separated from the rolling mill and enters the acting area of the electromagnets 5-8.

When the steel plate 1 is conveyed to a turning position between the initial suspension module and the intermediate transfer module, the central processing unit 4 controls the electromagnets 5-8 to act combinedly. The central processing unit 4 controls the current flowing into the electromagnets 5-8 according to the position and speed information transmitted from the sensor modules 18 of the electromagnets 5-8 so as to adjust the attraction of the electromagnets 5-8 to the steel plate 1. While the steel plate 1 is controlled to be conveyed forward, the entire steel plate is rotated by an angle, thereby completing the turning of the steel plate 1. At this time, the steel plate 1 is parallel to the electromagnets 7-14 of the intermediate transfer module, and forms an included angle a with the rolling mill placed horizontally. Under the combined action of the gravity and the attraction of the electromagnets 7-14, the steel plate is suspended, and is slowly conveyed forward while being cooled.

When the steel plate 2 is conveyed to the turning position between the intermediate transfer module and the tail end unloading module, the electromagnets 13-16 of the intermediate transfer module and the tail end unloading module act combinedly, and the central processing unit 4 adjusts the current flowing into the electromagnets 13-16 according to the position and speed information transmitted by the sensor modules 18 of the electromagnets 13-16 to the central processing unit 4, thereby adjusting the attraction of the electromagnets 13-16 to the steel plate 2. While the steel plate 2 is controlled to be conveyed forward, the entire steel plate is rotated by an angle, and transitions from the intermediate transfer module to the tail end unloading module. For the hot-rolled steel plate, it has already been cooled sufficiently at this time.

When the steel plate 3 is at the tail end unloading module, the central processing unit 4 controls the current flowing into the electromagnets 15-17 according to the position and speed information transmitted by the sensor modules 18 of the electromagnets 15-17, thereby adjusting the attraction of the electromagnets 15-17 to the steel plate 3. The steel plate 3 is controlled to move downward slowly, and finally, the steel plate 3 falls into the unloading area smoothly, thereby completing the conveyance.

Further, in the conveying process of the steel plate 1/2/3, if the sensor modules 18 detect following deviation information: a position misalignment of the steel plate 1/2/3, a distance deviation between the steel plate and the electromagnets 5-17 or an unsatisfactory motion speed of the steel plate 1/2/3, the sensor modules 18 immediately transmit the detected deviation information to the central processing unit 4, and then the central processing unit 4 controls the current flowing into the electromagnets 5-17, thereby adjusting the electromagnet attraction of the electromagnets 5-17 to the steel plate 1/2/3 to restore a motion state of the steel plate 1/2/3.

The detailed description will be given below in conjunction with the specific embodiments.

Embodiment 1

Referring to FIG. 1, the conveying device is configured to convey steel plates 1-3 having a length of 2500 mm, a width of 1500 mm and a thickness of 10 mm. The entire conveying device is divided into three modules, namely an initial suspension module, an intermediate transfer module and a tail end unloading module. The initial suspension module is parallel to the rolling mill placed horizontally, and has a total length of 3000 mm, with a purpose to suspend the rolled steel plate 1. The electromagnets 5-6 of the initial suspension module are parallel to the rolling mill placed horizontally, and a distance between every adjacent two is 1200 mm. An included angle between the intermediate transfer module and the rolling mill placed horizontally is 10°, and the intermediate transfer module has a total length of 40000 mm. The purpose is to convey the steel plate 2 forward, and for the hot-rolled steel plate 2, the purpose is to convey the steel plate forward while cooling. The electromagnets 7-14 of the intermediate transfer module are installed every 1200 mm, and form an included angle of 10° with the rolling mill placed horizontally. The tail end unloading module is parallel to the rolling mill placed horizontally, and the tail end unloading module has a total length of 4000 mm. The purpose is to gently convey the steel plate 3 to the ground, and for hot rolling, the purpose is to convey the cooled steel plate 3 to the ground. The electromagnets 15-17 of the tail end unloading module are parallel to the rolling mill placed horizontally, and a distance between every adjacent two is 1200 mm.

The detailed process is as follows:

After the steel plate 1 is conveyed out by the rolling mill, when the sensor modules 18 on the electromagnets 5-6 detect that the steel plate 1 is being conveyed, the position and speed information of the steel plate 1 is transmitted to the central processing unit 4, and the central processing unit 4 controls the current flowing into the electromagnets 5-6 to I=4.5 A according to the positions of the electromagnets 5-6 and the steel plate 1, thereby adjusting the resultant force of the attraction of the electromagnets 5-6 to the steel plate 1 to $F_{resultant}$=Mg=2962.5 N in the vertical upward direction. Under the combined actions of the electromagnets 5-6, it is ensured that the steel plate 1 is parallel to the rolling mill placed horizontally and is aligned and conveyed forward 2500 mm below the electromagnets 5-6 by inertia.

When the steel plate 1 is conveyed to the turning position between the initial suspension module and the intermediate transfer module, the central processing unit 4 controls the electromagnets 5-8 to act combinedly. The central processing unit 4 controls the current flowing into the electromagnets 5-8 to I=2.25 A according to the position and speed information transmitted from the sensor modules 18 of the electromagnets 5-8 so as to adjust the resultant force of the attraction of the electromagnets 5-8 to the steel plate 1 to $F_{resultant}$=2962.5 N in a direction forming an included angle of 70° with the horizontal direction, wherein the resultant force F1 of $F_{resultant}$ and the gravity G of the steel plate 1 is equal to 1028.9 N and the direction of the resultant force F1 forms an included angle of 10° with the horizontal direction. While the steel plate 1 is controlled to be conveyed forward, the entire steel plate is rotated by an included angle of 10°, thereby completing the turning of the steel plate 1. At this time, the steel plate 1 is parallel to the electromagnets 7-14 of the intermediate transfer module and forms an included angle of 10° with the rolling mill placed horizontally. During the conveyance at the intermediate transfer module, it is ensured that the steel plate 2 is parallel to the electromagnets 9-12. At a position 2500 mm below the electromagnets 7-14, the steel plate firstly runs at an acceleration of a1=F1/m=3.5 m/s². When the speed reaches V=0.1 m/s, the current of the electromagnets 9-14 is controlled to I=2.25 A. At this time, the gravity G of the steel plate 2 and the attraction $F_{resultant}$ of the electromagnets are equal in magnitude and opposite in direction, so that the steel plate 2 is aligned and conveyed forward at a speed of 0.1 m/s. For the hot-rolled steel plate 3, it is conveyed forward while being cooled.

When the steel plate 2 is conveyed to the turning position between the intermediate transfer module and the tail end unloading module, the central control unit 4 controls the electromagnets 13-16 to act combinedly. The central processing unit 4 controls the current flowing into the electromagnets 13-16 to I=2.25 A according to the position and speed information transmitted from the sensor modules 18 of the electromagnets 13-16 so as to adjust the attraction of the electromagnets 13-16 to the steel plate 2 to $F_{resultant}$=2962.5 N in a direction forming an included angle of 70° with the horizontal direction, wherein the resultant force F1 of $F_{resultant}$ and the gravity is equal to 1028.9 N and the direction of the resultant force F1 forms an included angle of 10° with the horizontal direction. While the steel plate 2 is controlled to be conveyed forward in a decelerated manner, the entire steel plate is rotated by an included angle of 10°, thereby completing the turning of the steel plate 2. The steel plate 3 of the tail end unloading module is parallel to the electromagnets 15-17, and is also parallel to the rolling mill placed horizontally. During the conveyance at the tail end unloading module, the central processing unit 4 controls the current flowing into the electromagnets 15-17 to I=3 A, thereby adjusting the attraction $F_{resultant}$ of the electromagnets 15-17 to the steel plate 3 to 2962.5 N. It is ensured that the steel plate 3 is parallel to the electromagnets 15-17 and moves downward slowly in the vertical direction, so that the speed of the steel plate 3 when contacting the ground is 0. For the hot-rolled steel plate 3, it has been cooled to the needed temperature at this time.

Embodiment 2

The conveying device is configured to convey steel plates 1-3 having a length of 2500 mm, a width of 1500 mm and a thickness of 10 mm. The entire conveying device is divided into three modules, namely an initial suspension module, an intermediate transfer module and a tail end unloading module. The initial suspension module is parallel to the rolling mill placed horizontally, and has a total length of 3000 mm, with a purpose to suspend the rolled steel plate 1. The electromagnets 5-6 of the initial suspension module are parallel to the rolling mill placed horizontally, and a distance between every adjacent two is 1200 mm. An included angle between the intermediate transfer module and the rolling mill placed horizontally is 10°, and the intermediate transfer module has a total length of 40000 mm. The purpose is to convey the steel plate 2 forward, and for the hot-rolled steel plate 2, the purpose is to convey the steel plate forward while cooling. The electromagnets 7-14 of the intermediate transfer module are installed every 1200 mm, and form an included angle of 10° with the rolling mill placed horizontally. The tail end unloading module is parallel to the rolling mill placed horizontally, and the tail end unloading module has a total length of 4000 mm. The purpose is to gently convey the steel plate 3 to the ground, and for hot rolling, the purpose is to convey the cooled steel plate 3 to the ground. The electromagnets 15-17 of the tail end unloading module are parallel to the rolling mill placed horizontally, and a distance between every adjacent two is 1200 mm.

When there is a position misalignment of the steel plates 1-3 during conveyance and the center line of the steel plates 1-3 deviates from the alignment line by 30°, the sensors 18 immediately transmit the deviation information to the central processing unit 4, and the central processing unit 4 adjusts the current of the corresponding electromagnets 5-17 to I=2.5 A according to the positions of the steel plates 1-3 and adjusts the direction of the attraction $F_{resultant}$ of the electromagnets 5-17 to the steel plate, so that the misaligned part of the steel plates 1-3 receives force until the steel plates 1-3 are restored to the aligned position.

When the steel plates 1-3 are conveyed at the intermediate transfer module of the conveying device and when the transfer speed of the steel plates 1-3 is 0.08 m/s, the central processing unit 4 increases the current of the corresponding electromagnets 5-17 to I=2.4 A, and thus, increases the attraction $F_{resultant}$ of the electromagnets 5-17 to the steel plates 1-3, so that the speed V is restored to the set value 0.1 m/s. When the transfer speed of the steel plates 1-3 is 0.12 m/s, the central processing unit 4 decreases the current of the corresponding electromagnets 5-17 to I=2.1 A, and thus, decreases the attraction $F_{resultant}$ of the electromagnets 5-17 to the steel plates, so that the speed V is restored to the set value 0.1 m/s.

When the distance between the steel plates 1-3 and the electromagnets 5-17 during conveyance is 2400 mm, the sensors 18 transmit the position information to the central processing unit 4, and the central processing unit 4 decreases the current of the corresponding electromagnets 5-17 to I=1.5 A, and thus, decreases the attraction $F_{resultant}$ of the electromagnets 5-17 to the steel plates, so that the steel plates 1-3 move downward for a certain distance until the distance is restored to 2500 mm. When the distance between the steel plates and the electromagnets 5-17 is 2600 mm, the sensors 18 transmit the position information to the central processing unit 4, and the central processing unit 4 increases the current of the corresponding electromagnets 5-17 to I=1.9 A, and thus, increases the attraction $F_{resultant}$ of the electromagnets 5-17 to the steel plate, so that the steel plates 1-3 move upward for a certain distance until the distance is restored to 2500 mm.

The preferred embodiments of the present application are described in detail above in conjunction with the accompanying drawings, but the present application is not limited thereto. Within the scope of the technical concept of the present application, many simple modifications can be made to the technical solutions of the present application, including the combination of various specific technical features in any suitable manner. In order to avoid unnecessary repetitions, various possible combination manners will not be described separately in the present application. However, these simple modifications and combinations should also be regarded as the content disclosed by the present application, and shall all belong to the protection scope of the present application.

What is claimed is:

1. A steel plate suspension conveying device, wherein the suspension conveying device comprises:
   an initial suspension module and a tail end unloading module that are installed horizontally;
   an intermediate transfer module installed between the initial suspension module and the tail end unloading module, wherein an included angle exists between the intermediate transfer module and the horizontal plane;
   a plurality of electromagnets capable of applying electromagnet attraction to a steel plate, respectively installed on the initial suspension module, the intermediate transfer module and the tail end unloading module, wherein the electromagnets of the initial suspension module controls the suspension of the steel plate, the electromagnets of the intermediate transfer module controls the motion of the steel plate toward the tail end unloading module, and the electromagnets of the tail end unloading module controls the landing of the steel plate;
   sensor modules installed on the electromagnets, wherein the sensor modules are capable of detecting the position, speed and temperature information of the steel plate conveyed by the electromagnets; and
   a central processing unit connected to the electromagnets and the sensor modules, wherein the central processing unit is capable of receiving the information sent by the sensor modules and adjusting the magnitude of a current/voltage flowing into the electromagnets, thereby adjusting the magnitude of the electromagnet attraction applied by the electromagnets to the steel plate.

2. The suspension conveying device according to claim 1, wherein an included angle between the electromagnets of the intermediate transfer module and the horizontal plane is 0°-60°.

3. The suspension conveying device according to claim 1, wherein an installation distance between every adjacent two of the electromagnets is 200 mm-4000 mm.

4. The suspension conveying device according to claim 1, wherein each of the sensor modules comprises a displacement sensor, a speed sensor and a temperature sensor.

5. The suspension conveying device according to claim 1, wherein the initial suspension module, the intermediate transfer module and the tail end unloading module make the steel plate suspended below the electromagnets within 150 mm-3000 mm.

6. The suspension conveying device according to claim 1, wherein the electromagnets make a conveying speed of the steel plate 0.01 m/s-10 m/s.

7. The suspension conveying device according to claim 1, wherein the initial suspension module, the intermediate transfer module and the tail end unloading module are sequentially connected to form a linear layout or a spiral layout; and/or, the conveyed steel plate has a length of 10 mm-7000 mm, a width of 5 mm-10000 mm and a thickness of 0.1-500 mm; and/or, the suspension conveying device has a total length of 200 mm-60000 mm.

8. A steel plate suspension conveying method, wherein the method is carried out in the suspension conveying device according to claim 1, comprising the following steps:
S1, connecting the initial suspension module to a discharge port of a rolling mill, driving a steel plate to enter the initial suspension module by the rolling mill, and then adjusting the electromagnets of the initial suspension module to generate electromagnetic attraction by the sensor modules in cooperation with the central processing unit so as to control the steel plate for suspension;
S2, making the suspended steel plate enter the intermediate transfer module by using inertia of the steel plate or driving of the rolling mill, and then adjusting the electromagnets of the intermediate transfer module to generate electromagnetic attraction by the sensor modules in cooperation with the central processing unit so as to control the motion of the steel plate toward the tail end unloading module; and
S3, adjusting a magnitude of the electromagnetic attraction of the electromagnets of the tail end unloading module by the sensor modules in cooperation with the central processing unit such that the steel plate is unloaded and lands, after the intermediate transfer module controls the steel plate to enter the tail end unloading module.

9. The suspension conveying method according to claim 8, wherein when the sensor modules detect following deviation information: a position misalignment of the steel plate, a distance deviation between the steel plate and the electromagnets or an unsatisfactory motion speed of the steel plate, the sensor modules immediately transmit the detected deviation information to the central processing unit, and then the central processing unit controls a current flowing into the electromagnets, thereby adjusting the attraction of the electromagnets to the steel plate to restore and correct a motion state of the steel plate.

10. Application of the steel plate suspension conveying device according to claim 1 in transportation of magnetic materials.

\* \* \* \* \*